United States Patent Office 3,247,384
Patented Apr. 19, 1966

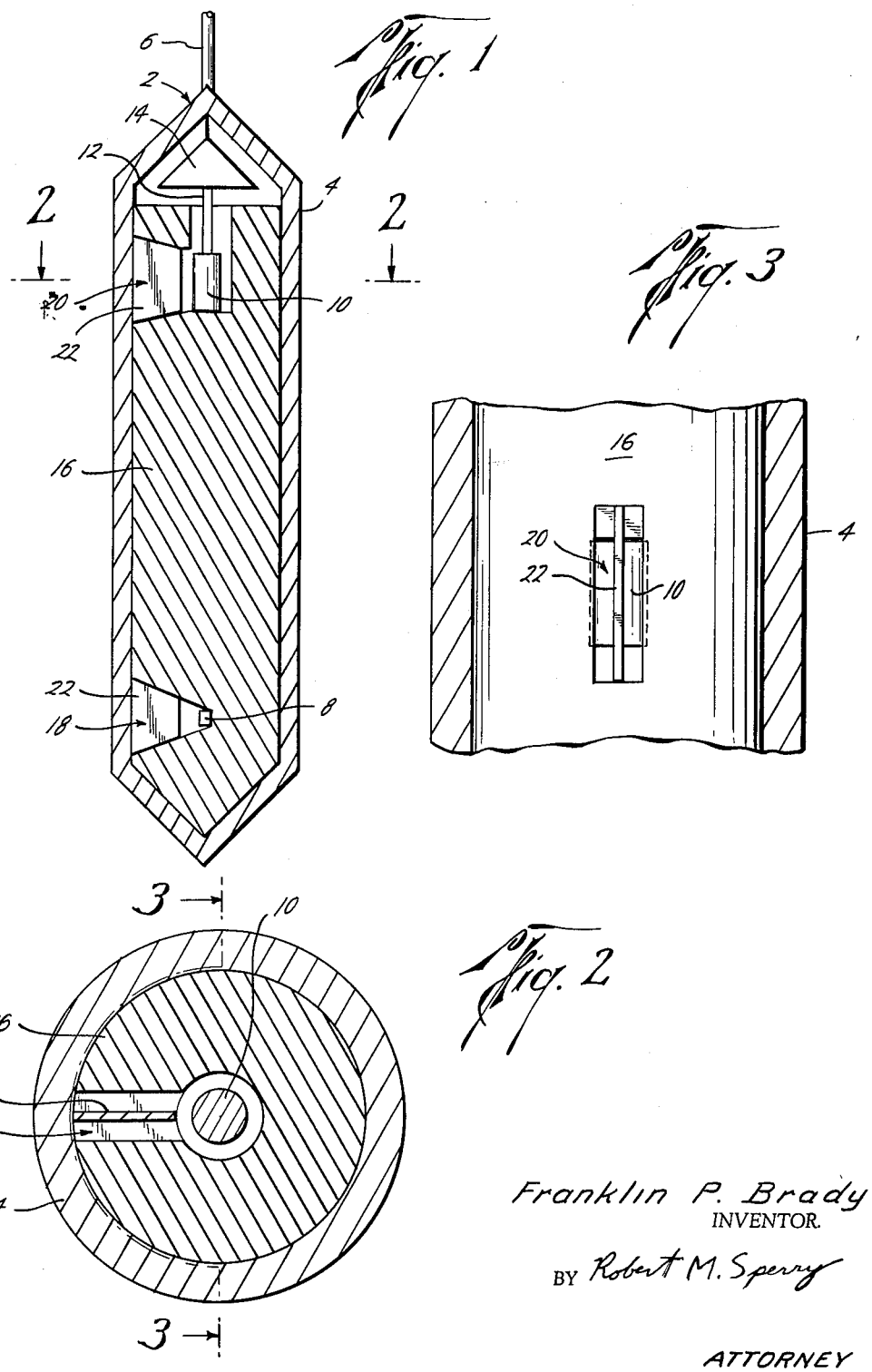

3,247,384
RADIALLY COLLIMATING WINDOW FOR WELL-TOOL ORIENTING INSTRUMENTS
Franklin P. Brady, Davis, Calif., assignor to Schlumberger Well Surveying Corp., Houston, Tex., a corporation of Texas
Filed Oct. 16, 1962, Ser. No. 230,980
1 Claim. (Cl. 250—105)

This invention relates to nuclear well-tool orienting instruments and is particularly directed to novel means for improving the angular resolution of directionally sensitive well-tool orienting instruments.

In the art of nuclear well-tool orienting, a subsurface instrument containing a source of radiation, such as gamma rays or neutrons, and a radiation detector, is suspended in a borehole by means of a cable, and signals from the detector are transmitted via the cable to suitable surface equipment where some function of the detector signal is recorded as an indication of a particular characteristic of the subsurface environment of the borehole. In some well-tool orienting instruments, shielding means opaque to radiation is disposed about the source and detector, and windows are formed through the shielding material to collimate the radiation and, thus, to make the instrument sensitive to direction. Such an instrument is disclosed in the copending application of Maurice P. Lebourg, Serial No. 838,282, filed September 4, 1959 and employs a collimated gamma-ray source and detector to orient a perforating gun so that workover operations can be conducted in one casing or tubing string of a multiple completion well without the danger of inadvertently perforating adjacent strings of tubing which may be on production.

Obviously, in any system where directional sensitivity is of interest, the accuracy and reliability of the system depend heavily upon the angular resolution of the source and detector. This, of course, is determined primarily by the size and shape of the collimating windows. It may be assumed, for purposes of this discussion, that radiation travels in straight lines, and it will be apparent that reducing the width of the collimating windows will improve the angular resolution of the system. This has been the practice followed in designing the prior art systems. Unfortunately, the intensity of the radiation passed by the collimating windows is proportional to the width of the window; hence, reducing the width of the window correspondingly reduced the counting rate of the detector. As the counting rate is decreased, the signal-to-noise ratio of the detector output is also decreased. Consequently, it is necessary to make a compromise between the angular resolution of the system and the counting rate.

These disadvantages of prior art well-tool orienting instruments are overcome with the present invention and novel means are provided which greatly improve the angular resolution of directionally sensitive well-tool orienting instruments without proportionately reducing the counting rate.

The advantages of the present invention are preferably obtained by providing one or more thin strips or shutters formed of a material having a high coefficient of absorption for the radiation of interest, and by mounting said strips to vertically divide the collimating windows. It has been found that this arrangement greatly reduces the loss of counting rate for any given improvements in the angular resolution of the instrument.

Accordingly, it is an object of the present invention to provide a subsurface instrument for nuclear well-tool orienting having improved directional sensitivity.

Another object of the present invention is to provide means for improving the angular resolution of directionally sensitive nuclear well-tool orienting instruments without proportionately reducing the counting rate.

A specific object of the present invention is to provide a subsurface instrument for nuclear well-tool orienting comprising a radiation source, a radiation detector, shielding means opaque to radiation disposed about said source and said detector, window means transparent to radiation extending through said shielding material to cause said instrument to be directionally sensitive, and at least one strip formed of a material having a high coefficient of absorption for radiation mounted in at least one of said windows in such a way as to vertically divide said one of said windows.

These and other objects and features of the present invention will be apparent from the following detailed description taken with reference to the figures of the accompanying drawing.

In the drawing:

FIG. 1 is a vertical section through a subsurface well-tool orienting instrument embodying the present invention;

FIG. 2 is a transverse section through the instrument of FIG. 1, taken on the line 2—2 thereof; and FIG. 3 is a vertical section taken on the line 3—3 of FIG. 2.

In that form of the present invention chosen for purposes of illustration, FIG. 1 shows a subsurface instrument 2 having a pressure-resistant housing 4 attached to a cable 6 which serves to support the instrument 2 in a borehole and to provide electrical connections between the instrument 2 and suitable recording equipment, not shown, at the surface of the earth. Within the pressure housing 4 are mounted a radiation source 8 and a radiation detector 10. Detector 10 is connected by conductors 12 to electronic cartridge 14 which includes appropriate circuitry for energizing detector 10 and for receiving signals from detector 10 for transmission to the surface of the earth via cable 6 or for utilizing the signals to perform a desired function, such as orienting a perforating gun as taught in the above-identified application of Lebourg. The specific circuitry included in cartridge 14 will vary depending upon the type of information sought, and the use to which the signals are to be put. In any event, the specific circuitry of cartridge 14 has no bearing on the present invention and, therefore, need not be shown or described in detail. The source 8 may emit either gamma rays or neutrons, or both. Similarly, detector 10 may be substantially any type of radiation detector which emits electrical signals in response to detection of radiation.

To cause the instrument 2 to be directionally sensitive, suitable shielding material 16, which is opaque to radiation, is disposed about the source 8 and detector 10, and windows 8 and 20, which are transparent to radiation, are provided adjacent the source 8 and detector 10, respectively. The shielding material 16 may be lead, Hevimet or the like, which are opaque to gamma rays, or may be boron, paraffin, or the like, which are opaque to neutrons. The windows 18 and 20 may merely be apertures formed in the shielding material 16, or they may be formed of any material which is transparent to radiations, such as aluminum for gamma rays. As indicated above, the angular resolution of the instrument 2 is determined primarily by the width of the windows 18 and 20. In accordance with prior art practice, a change in the angular resolution of the system, for example, from sixty degrees to thirty degrees, could be obtained by reducing the width of the windows to approximately one-half the original width. However, this would also result in decreasing the counting rate of the detector by at least half of its prior value. In contrast, applicant has found that the same improvement in angular resolution can be obtained with a significantly smaller loss in counting rate by leaving the width of the windows at their original size, by providing one or more thin strips, indicated in FIGS. 1–3 at 22, formed of material having a high coefficient of absorption for radiation, and by mounting the strips 22 to vertically divide the windows 18 and 20, in the manner illustrated in FIGS. 2 and 3. As shown in the drawing, strips 22 are provided in both the source window 18 and the detector window 20. However, substantial improvement over the systems of the prior art can be obtained even where the strips 22 are employed in only one of the windows. As a specific example, in an instrument having a gamma-ray source and a gamma-ray detector and employing windows having a width of 5/16 inch, the angular resolution was formed to be sixty degrees. However, by providing a strip, corresponding to strip 22, formed of tantalum of 1/64 inch thickness, and mounting the strip in the detector window only, the angular resolution of the instrument was found to be thirty degrees while the counting rate had been reduced by only one-fourth to one-third of its original value. Still greater angular resolution could be obtained by employing strips 22 in both the source window 18 and the detector window 20, as shown in the drawing, and by employing additional strips 22 mounted parallel to the strips 22 as shown.

Where the window is intended for passage of gamma rays, the strips 22 are preferably formed of such materials as tantalum, tungsten, or molybdenum; whereas, when the window is intended for passage of neutrons, such materials as boron or paraffin are preferred. Obviously, numerous variations and modifications can be made without departing from the invention. Accordingly, it should be clearly understood that the form of the invention described above and shown in the figures of the accompanying drawing is illustrative only and is not intended to limit the scope of the invention.

What is claimed is:

In a well-tool orienting instrument comprising a cylindrical pressure housing, a gamma ray source and a gamma ray detector therein spaced longitudinally apart, and shielding opaque to gamma radiation disposed between and about said source and detector and defining a pair of open windows extending respectively from said source and said detector radially to the interior wall of said housing, said source and detector windows each having a rectangular shape elongated in the direction of said housing and with a width of about 5/16", a strip of material selected from the group consisting of tantalum, tungsten and molybdenum mounted in at least said detector window in a radial plane bisecting the same, said strip being substantially coextensive with the dimensions of said detector window in said plane and having a thickness on the order of 1/64" thereby to enhance the angular resolution of said instrument for more accurate orientation in a radial plane.

References Cited by the Examiner

UNITED STATES PATENTS

| | | | |
|---|---|---|---|
| 2,730,566 | 1/1956 | Bartow et al. | 250—105 X |
| 2,934,652 | 4/1960 | Caldwell et al. | 250—108 X |
| 2,944,148 | 7/1960 | Johnson et al. | 250—105 X |

RALPH G. NILSON, *Primary Examiner.*

ARCHIE R. BORCHELT, *Examiner.*